United States Patent
Hsu

(10) Patent No.: US 6,711,795 B1
(45) Date of Patent: Mar. 30, 2004

(54) DEVICE TO REMOVE JOINT FROM AXLE OF VEHICLE

(75) Inventor: Allen Chun-Chih Hsu, Chang Hua Hsien (TW)

(73) Assignee: Yuan Cherng Industry Co., Ltd., Chang Hua Hsien (TW)

( * ) Notice: Subject to any disclaimer, the term of this patent is extended or adjusted under 35 U.S.C. 154(b) by 0 days.

(21) Appl. No.: 10/347,717

(22) Filed: Jan. 20, 2003

(51) Int. Cl.[7] .............................................. B23P 19/04
(52) U.S. Cl. ............................. 29/254; 29/275; 29/263
(58) Field of Search ........................... 29/254, 255, 263, 29/264, 275, 281.1, 282, 283; 254/29 R

(56) References Cited

U.S. PATENT DOCUMENTS

| | | | | |
|---|---|---|---|---|
| 3,880,604 A | * | 4/1975 | Hawkins | 29/252 |
| 4,283,827 A | * | 8/1981 | Abel | 29/254 |
| 4,733,450 A | * | 3/1988 | Pool | 29/254 |
| 5,906,034 A | * | 5/1999 | Weisshaar | 29/257 |
| 6,546,610 B2 | * | 4/2003 | Klann | 29/257 |

* cited by examiner

Primary Examiner—Joseph J. Hail, III
Assistant Examiner—Daniel Shanley
(74) Attorney, Agent, or Firm—Charles E. Baxley

(57) ABSTRACT

A device for removing joint from axle includes a bar slidably supported on a track and adjustable relative to the track to support the axle, an arm having a hammer movable toward and to engage with the joint, and to disengage the joint from the axle, for allowing the joint to be easily and quickly disengaged from the axle without much labor work. One or more inserts may be selectively or changeably secured to the bar, to support axles of different widths or diameters. A bolt is threaded with the bar and driven by a motor to move the bar relative to the track.

14 Claims, 5 Drawing Sheets

DEVICE TO REMOVE JOINT FROM AXLE OF VEHICLE

BACKGROUND OF THE INVENTION

1. Field of the Invention

The present invention relates to a device, and more particularly to a device for removing joints from axles of vehicles.

2. Description of the Prior Art

Typical axles of vehicles, particularly the front wheel transmission axles of vehicles each comprises a joint secured thereon. The joints have a good chance to be damaged after use, and have a good chance to be removed from the axles for repairing purposes.

However, the joints are solidly secured to the axles of the vehicles, and may not be easily disengaged or removed from the axles of vehicles. It normally takes a long time and a number of working processes to remove or to disengage the joints from the axles of vehicles by the workers.

The present invention has arisen to mitigate and/or obviate the afore-described disadvantages of the conventional processes to remove or to disengage the joints from the vehicle axles.

SUMMARY OF THE INVENTION

The primary objective of the present invention is to provide a device for easily and quickly removing or disengaging joints from axles of vehicles without much labor work.

In accordance with one aspect of the invention, there is provided a device for removing joint from axle, the device comprising a track, a bar slidably supported on the track, and adjustable relative to the track, to support the axle, an arm including a first end having a hammer provided thereon, and means for moving the hammer of the arm toward and to engage with the joint, and to disengage the joint from the axle, for allowing the joint to be easily and quickly disengaged from the axle without much labor work.

The track includes at least one channel defined by at least one post, to slidably receive the bar. The bar includes at least one groove formed therein, to slidably receive the post, and to guide the bar to move along the track.

A bolt is threaded with the bar, and a motor is coupled to the bolt, to rotate the bolt, and to move the bar relative to the track. The bar includes a slot formed therein to receive the axle.

An insert may further be provided and selectively supported in the bar to anchor the axle of different width or diameter. The insert includes a recess formed therein to receive the axle.

The bar includes an opening formed therein to receive the insert therein. The bar includes a peripheral swelling extended into the opening thereof to define a peripheral shoulder therein, the insert includes a peripheral shoulder formed therein to engage with the peripheral shoulder of the bar, and to secure the insert in the opening of the bar.

One or more microswitches may further be provided for limiting a movement of the bar relative to the bar.

A housing may further be provided to support the track and the arm. One or more springs or cushioning members may further be provided for prevent the housing from being hammered by the hammer.

An actuator may further be provided and coupled to the arm, to move the hammer of the arm toward and to engage with the joint. A valve may further be provided and coupled to the actuator and to control the actuator.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
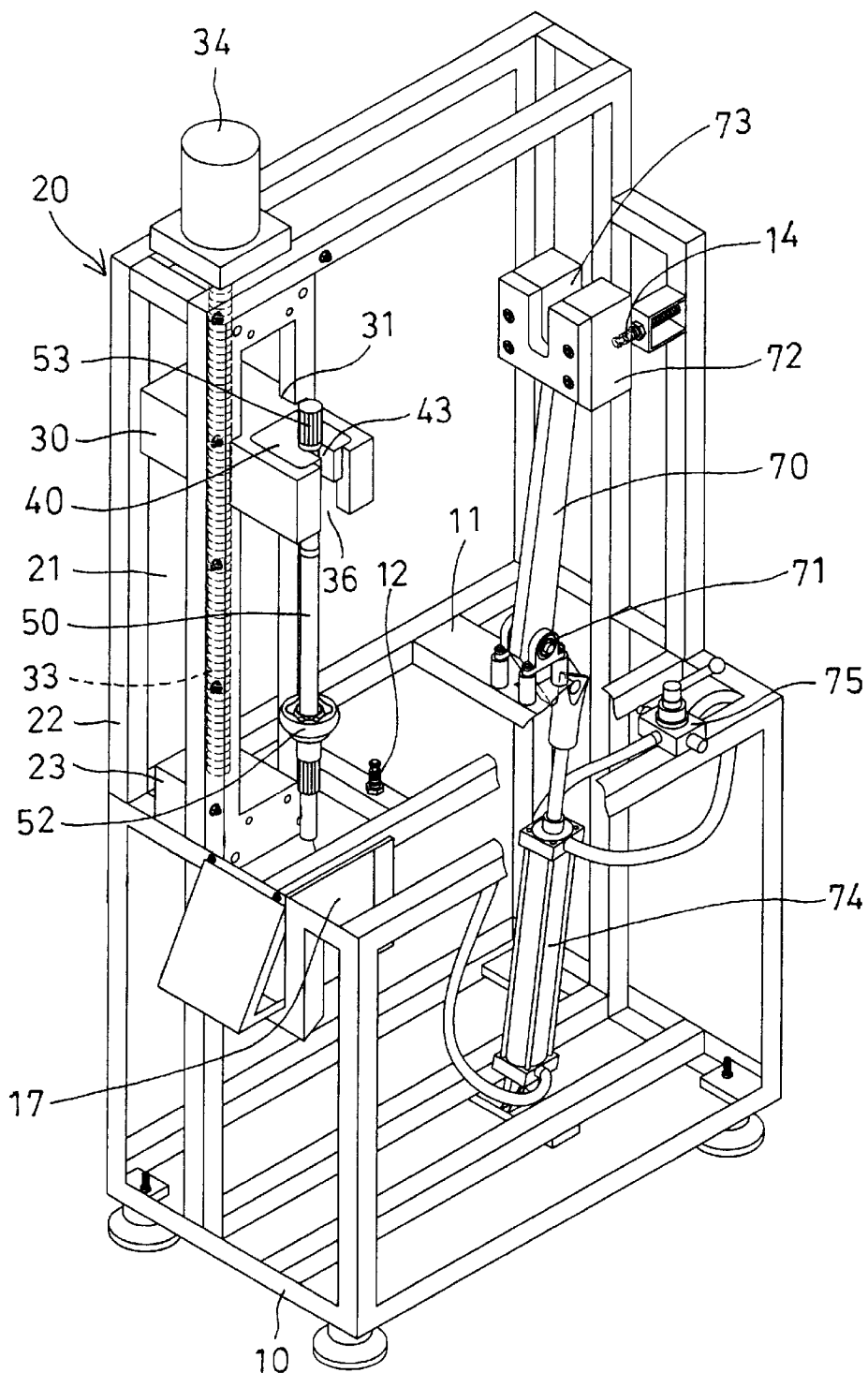
FIG. 1 is a perspective view of a device in accordance with the present invention.
Figure 2:
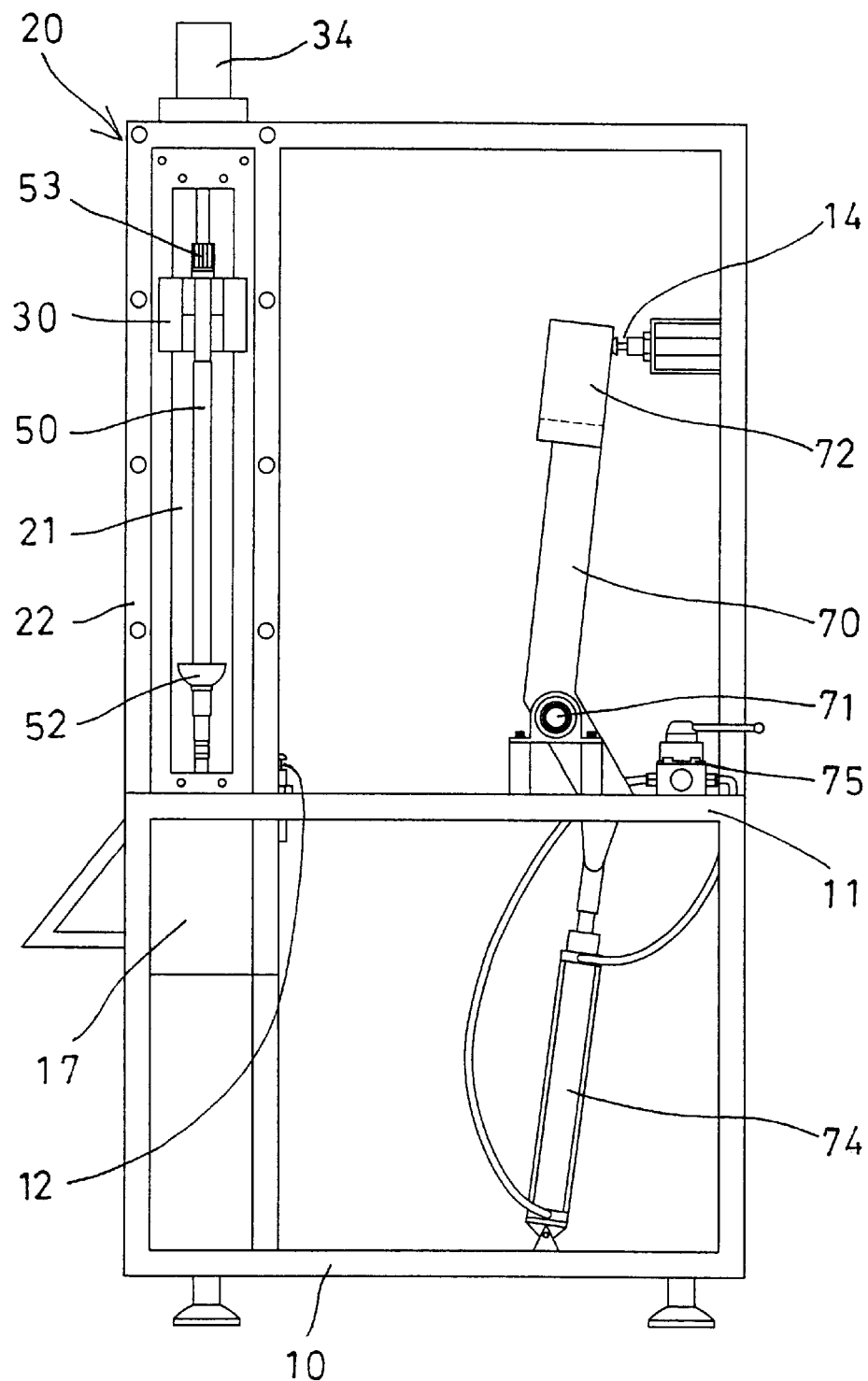
FIG. 2 is a front elevational view of the device.

Referring to the drawings, and initially to FIGS. 1 and 2, a device in accordance with the present invention is provided for easily and quickly removing or disengaging joints 52 from axles 50 of vehicles without much labor work.

The device comprises a frame or a housing 10 including a track 20 provided on the upper portion thereof, such as vertically provided on the rear and side portion thereof. For example, the track 20 includes one or more channels 21 formed or defined by one or more posts 22.

Figure 3:
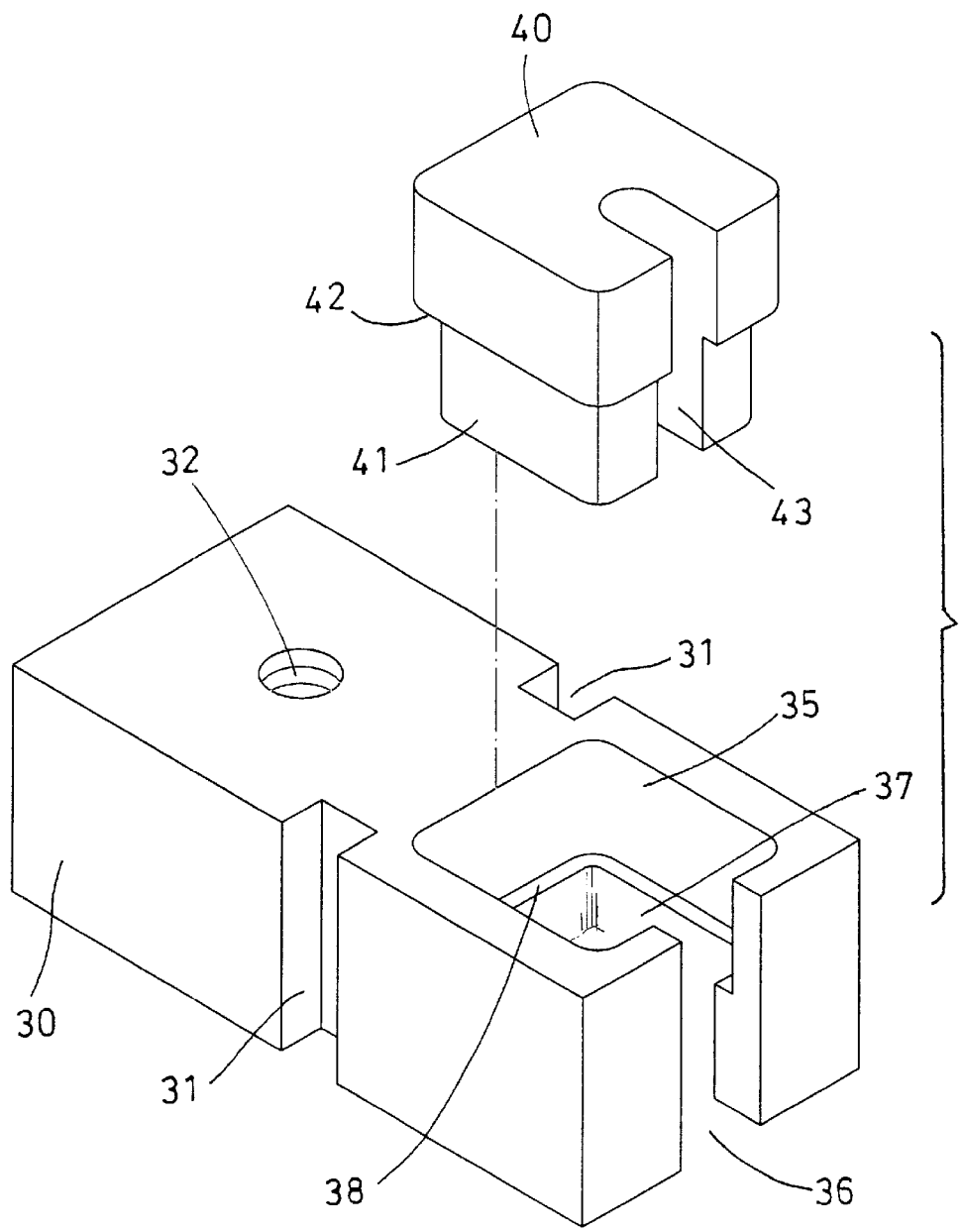
FIG. 3 is a partial exploded view of the device.

A bar 30 is slidably received in the track 20, and includes one or more grooves 31 formed therein (FIG. 3), to slidably receive the posts 22 respectively, and to guide the bar 30 to move up and down along the posts 22 or the channel 21 of the track 20. The bar 30 includes a screw hole 32 formed therein.

A bolt 33 is threaded through the screw hole 32 of the bar 30, and coupled to a motor 34 which is disposed on top of the housing 10, and which may rotate and drive the bolt 33 to move the bar 30 up and down along the track 20. A seat 23 (FIG. 1) may further be provided in the lower portion of the track 20 to stably and rotatably support the bolt 33.

Figure 5:
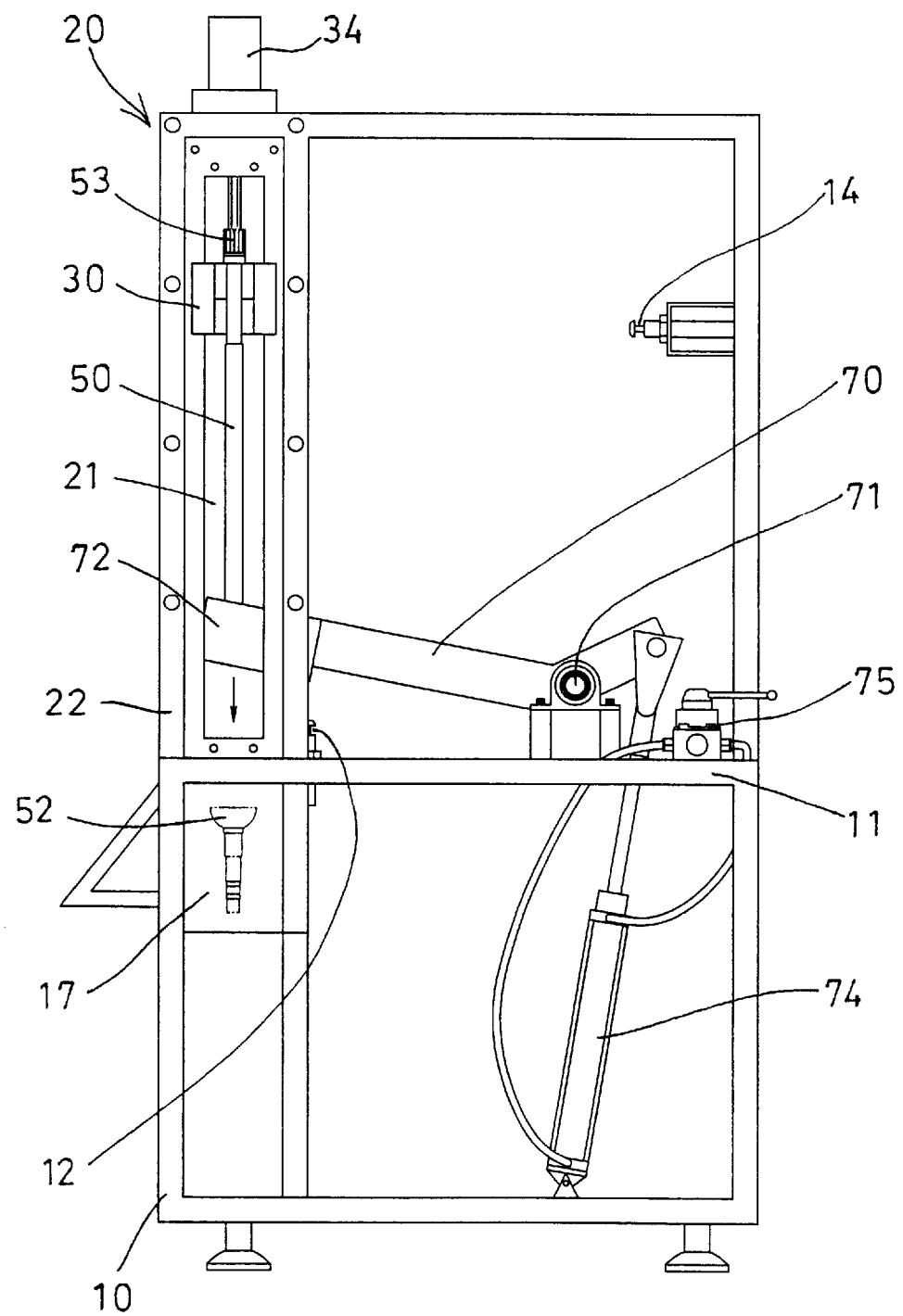
FIG. 5 is a front elevational view similar to FIG. 2, illustrating the operation of the device.

As shown in FIGS. 1, 2, and 5, the bar 30 is provided to support the axle 50 of the vehicle at a downwardly dependent position, and includes an opening 35 and a slot 36 formed therein (FIG. 3) to receive one end of the axle 50, and to anchor the axle 50. The axle 50 may include an enlarged head 53 formed or provided on one end thereof and anchored or supported by the bar 30.

One or more inserts 40 may further be provided and selectively or changeably secured in the opening 35 of the bar 30, and each may include a recess 43 formed therein, and aligned with the slot 36 of the bar 30. The recesses 43 of the inserts 40 may include different widths to receive and to support axles 50 of different widths or diameters.

The bar 30 includes a peripheral swelling 37 extended into the lower portion of the opening 35 thereof, to form or define a peripheral shoulder 38 in the middle portion thereof. The inserts 40 each includes a reduced lower portion 41 to form or define a peripheral shoulder 38 in the middle portion thereof, and to engage with the peripheral shoulder 38 of the bar 30, for allowing the inserts 40 to be selectively or changeably supported in the bar 30.

Figure 4:
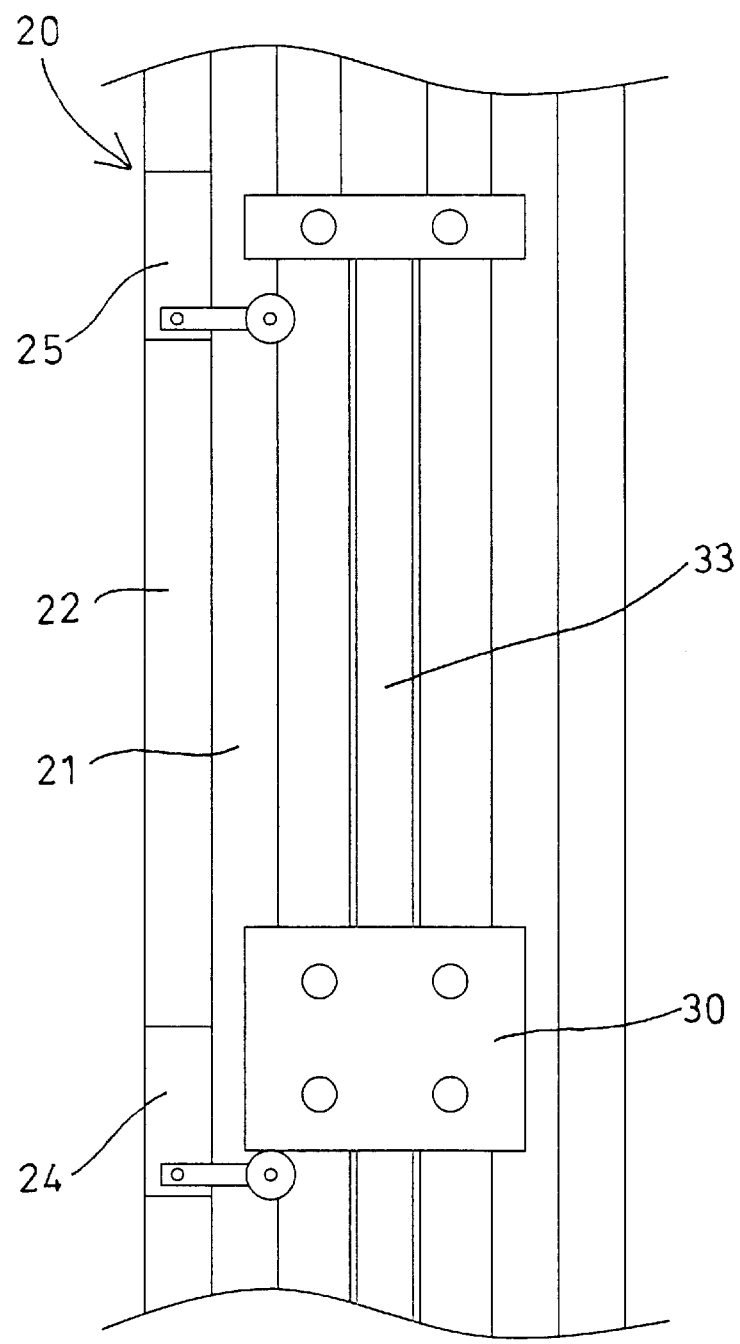
FIG. 4 is a partial rear plan view of the device.

In operation, the head 53 of the axle 50 may be anchored or supported by the bar 30 or by either of the inserts 40, and may have the joint 52 thereof arranged or disposed in the middle or lower portion thereof. One or more microswitches 24, 25 may be attached to the track 20 (FIG. 4), to engage with the bar 30, and to limit the up and down movement of the bar 30 relative to the track 20 or the housing 10.

The housing 10 includes a table or a base 11 provided or disposed in the middle portion thereof. An arm 70 includes a middle portion pivotally or rotatably secured to the housing 10, such as to the base 11 of the housing 10 with a pivot pin 71, and includes a hammer 72 provided on one end thereof for engaging with and for hammering or disengaging the joint 52 from the axle 50.

As best shown in FIG. 1, the hammer 72 includes a notch 73 formed therein and having a width no less then that of the axle 50, for receiving the axle 50 (FIG. 5), and for allowing the hammer 72 to engage with and to hammer or disengage the joint 52 from the axle 50.

An actuator 74, such as a hydraulic or pneumatic cylinder 74 is coupled between the housing 10 and the other end of the arm 70, to move the hammer 72 toward or away from the joint 52 or axle 50. A valve 75 may be used to supply or to discharge hydraulic oil or pressurized air into and out of the actuator 74.

In operation, the axle 50 may first be anchored and supported on the bar 30, and may have the joint 52 supported on the middle portion thereof. The hammer 72 may then be forced toward the axle 50, and to engage with the joint 52, in order to hammer or disengage the joint 52 from the axle 50, such that the joint 52 may be easily and quickly disengaged from the axle 50 by the device, without much labor work.

The housing 10 may further include one or more spring or cushioning members 12, 14 to engage with either the arm 70 or the hammer 72, and to damp the arm 70 or the hammer 72, and to prevent the housing 10 from being hammered or damaged by the hammer 72. The housing 10 may include a collector portion 17 to receive or to collect the joint 52 (FIG. 5) that is disengaged from the axle 50.

Accordingly, the device in accordance with the present invention may be used for easily and quickly removing or disengaging joints from axles of vehicles without much labor work.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A device for removing a joint from an axle, said device comprising:

a track, a bar slidably supported on said track, and adjustable relative to said track, to support the axle, an arm including a first end having a hammer provided thereon, and means for moving said hammer of said arm toward and to engage with the joint, and to disengage the joint from the axle.

2. The device as claimed in claim 1, wherein said track includes at least one channel defined by at least one post, to slidably receive said bar.

3. The device as claimed in claim 2, wherein said bar includes at least one groove formed therein, to slidably receive said at least one post, and to guide said bar to move along said track.

4. The device as claimed in claim 1 further comprising a bolt threaded with said bar, and a motor coupled to said bolt, to rotate said bolt, and to move said bar relative to said track.

5. The device as claimed in claim 1, wherein said bar includes a slot formed therein to receive the axle.

6. The device as claimed in claim 1 further comprising an insert supported in said bar to anchor the axle.

7. The device as claimed in claim 6, wherein said insert includes a recess formed therein to receive the axle.

8. The device as claimed in claim 6, wherein said bar includes an opening formed therein to receive said insert therein.

9. The device as claimed in claim 8, wherein said bar includes a peripheral swelling extended into said opening thereof to define a peripheral shoulder therein, said insert includes a peripheral shoulder formed therein to engage with said peripheral shoulder of said bar, and to secure said insert in said opening of said bar.

10. The device as claimed in claim 1 further comprising means for limiting a movement of said bar relative to said bar.

11. The device as claimed in claim 1 further comprising a housing to support said track and said arm.

12. The device as claimed in claim 11 further comprising means for preventing housing from being hammered by said hammer.

13. The device as claimed in claim 1, wherein said moving means includes an actuator coupled to said arm, to move said hammer of said arm toward and to engage with the joint.

14. The device as claimed in claim 13 further comprising a valve coupled to said actuator and to control said actuator.

* * * * *